United States Patent
Bielas

(10) Patent No.: US 8,427,316 B2
(45) Date of Patent: Apr. 23, 2013

(54) DETECTING TAMPERED WITH RADIO FREQUENCY IDENTIFICATION TAGS

(75) Inventor: Wolf Bielas, Chula Vista, CA (US)

(73) Assignee: 3M Innovative Properties Company, St. Paul, MN (US)

(*) Notice: Subject to any disclaimer, the term of this patent is extended or adjusted under 35 U.S.C. 154(b) by 296 days.

(21) Appl. No.: 12/052,544

(22) Filed: Mar. 20, 2008

(65) Prior Publication Data
US 2009/0237249 A1   Sep. 24, 2009

(51) Int. Cl.
G08B 13/14   (2006.01)
H01Q 1/12    (2006.01)
H01Q 21/00   (2006.01)

(52) U.S. Cl.
USPC ......... 340/572.1; 340/572.3; 340/572.7; 340/572.8; 340/572.9; 343/718; 343/878; 343/867

(58) Field of Classification Search .... 340/572.1–572.9; 343/718, 878, 867
See application file for complete search history.

(56) References Cited

U.S. PATENT DOCUMENTS

| | | |
|---|---|---|
| 3,568,197 A | 3/1971 | Cubley |
| 3,663,932 A | 5/1972 | Mount et al. |
| 3,688,250 A | 8/1972 | Howlett |
| 3,696,429 A | 10/1972 | Tressa |
| 3,876,946 A | 4/1975 | La Clair et al. |
| 3,984,835 A | 10/1976 | Kaplan et al. |
| 4,243,955 A | 1/1981 | Daniel et al. |
| 4,297,672 A | 10/1981 | Fruchey et al. |
| 4,325,057 A | 4/1982 | Bishop |
| 4,509,123 A | 4/1985 | Vereen |
| 4,595,915 A | 6/1986 | Close |
| 4,849,706 A | 7/1989 | Davis et al. |
| 4,857,925 A | 8/1989 | Brubaker |
| 4,870,391 A | 9/1989 | Cooper |
| 4,873,529 A | 10/1989 | Gibson |
| 4,903,033 A | 2/1990 | Tsao et al. |
| 4,968,967 A | 11/1990 | Stove |
| 5,012,225 A | 4/1991 | Gill |
| 5,021,780 A | 6/1991 | Fabiano et al. |
| 5,038,283 A | 8/1991 | Caveney |

(Continued)

FOREIGN PATENT DOCUMENTS

| | | |
|---|---|---|
| CA | 2218269 | 4/1999 |
| EP | 0133317 | 2/1985 |

(Continued)

OTHER PUBLICATIONS

International Search Report and Written Opinion of the International Searching Authority issued in corresponding International Application No. PCT/US2009/037633; May 15, 2009; 12 pages.

(Continued)

Primary Examiner — Hai Phan
Assistant Examiner — Ojiako Nwugo

(57) ABSTRACT

The present disclosure is directed to a system and method for tracking tampered with RFID tags. In some implementations, an RFID tag includes a tearable substrate including at least a portion of an RFID circuit. The portion of the RFID circuit is substantially destroyable in response to at least an attempt to remove the tag from a surface. In addition, the RFID includes an adhesive layer adjacent at least a portion of the tearable substrate and configured to affix the tag to the surface.

17 Claims, 4 Drawing Sheets

U.S. PATENT DOCUMENTS

| | | | |
|---|---|---|---|
| 5,095,536 A | 3/1992 | Loper |
| 5,165,109 A | 11/1992 | Han et al. |
| 5,278,563 A | 1/1994 | Spiess |
| 5,278,569 A | 1/1994 | Ohta et al. |
| 5,293,408 A | 3/1994 | Takahashi et al. |
| 5,334,822 A | 8/1994 | Sanford |
| 5,381,157 A | 1/1995 | Shiga |
| 5,396,489 A | 3/1995 | Harrison |
| 5,430,441 A | 7/1995 | Bickley et al. |
| 5,444,864 A | 8/1995 | Smith |
| 5,461,374 A | 10/1995 | Lewiner et al. |
| 5,477,215 A | 12/1995 | Mandelbaum |
| 5,495,500 A | 2/1996 | Jovanovich et al. |
| 5,506,584 A | 4/1996 | Boles |
| 5,519,729 A | 5/1996 | Jurisch et al. |
| 5,539,394 A | 7/1996 | Cato et al. |
| 5,608,379 A | 3/1997 | Narlow et al. |
| 5,613,216 A | 3/1997 | Galler |
| 5,630,072 A | 5/1997 | Dobbins |
| 5,648,767 A | 7/1997 | O'Connor et al. |
| 5,649,295 A | 7/1997 | Shober et al. |
| 5,661,485 A | 8/1997 | Manuel |
| 5,661,494 A | 8/1997 | Bondyopadhyay |
| 5,668,558 A | 9/1997 | Hong |
| 5,708,423 A | 1/1998 | Ghaffari et al. |
| 5,729,576 A | 3/1998 | Stone et al. |
| 5,745,037 A | 4/1998 | Guthrie et al. |
| 5,777,561 A | 7/1998 | Chieu et al. |
| 5,784,414 A | 7/1998 | Bruekers et al. |
| 5,825,753 A | 10/1998 | Betts et al. |
| 5,831,578 A | 11/1998 | Lefevre |
| 5,841,814 A | 11/1998 | Cupo |
| 5,850,187 A | 12/1998 | Carrender et al. |
| 5,861,848 A | 1/1999 | Iwasaki |
| 5,892,396 A | 4/1999 | Anderson et al. |
| 5,898,405 A | 4/1999 | Iwasaki |
| 5,905,405 A | 5/1999 | Ishizawa |
| 5,940,006 A | 8/1999 | MacLellan et al. |
| 5,974,301 A | 10/1999 | Palmer et al. |
| 6,025,780 A | 2/2000 | Bowers et al. |
| 6,026,378 A | 2/2000 | Onozaki |
| 6,084,530 A | 7/2000 | Pidwerbetsky et al. |
| 6,094,149 A | 7/2000 | Wilson |
| 6,107,910 A | 8/2000 | Nysen |
| 6,121,929 A | 9/2000 | Olson et al. |
| 6,137,447 A | 10/2000 | Saitoh et al. |
| 6,177,861 B1 | 1/2001 | MacLellan et al. |
| 6,192,225 B1 | 2/2001 | Arpaia et al. |
| 6,219,534 B1 | 4/2001 | Torii |
| 6,229,817 B1 | 5/2001 | Fischer et al. |
| 6,229,987 B1 | 5/2001 | Greeff et al. |
| 6,232,837 B1 | 5/2001 | Yoo et al. |
| 6,275,192 B1 | 8/2001 | Kim |
| 6,317,027 B1 | 11/2001 | Watkins |
| 6,320,542 B1 | 11/2001 | Yamamoto et al. |
| 6,366,216 B1 | 4/2002 | Olesen |
| 6,412,086 B1 | 6/2002 | Friedman et al. |
| 6,414,626 B1 | 7/2002 | Greef et al. |
| 6,442,276 B1 | 8/2002 | Doljack |
| 6,456,668 B1 | 9/2002 | MacLellan et al. |
| 6,459,687 B1 | 10/2002 | Bourlas et al. |
| 6,466,130 B2 | 10/2002 | Van Horn et al. |
| 6,492,933 B1 | 12/2002 | McEwan |
| 6,501,807 B1 | 12/2002 | Chieu et al. |
| 6,531,957 B1 | 3/2003 | Nysen |
| 6,538,564 B1 | 3/2003 | Cole |
| 6,566,997 B1 | 5/2003 | Bradin |
| 6,567,648 B1 | 5/2003 | Ahn et al. |
| 6,603,391 B1 | 8/2003 | Greeff et al. |
| 6,639,509 B1 | 10/2003 | Martinez |
| 6,700,547 B2 | 3/2004 | Mejia et al. |
| 6,714,121 B1 | 3/2004 | Moore |
| 6,714,133 B2 | 3/2004 | Hum et al. |
| 6,768,441 B2 | 7/2004 | Singvall et al. |
| 6,774,685 B2 | 8/2004 | O'Toole et al. |
| 6,784,789 B2 | 8/2004 | Eroglu et al. |
| 6,794,000 B2 | 9/2004 | Adams et al. |
| 6,798,384 B2 | 9/2004 | Aikawa et al. |
| 6,816,125 B2 | 11/2004 | Kuhns et al. |
| 6,819,938 B2 | 11/2004 | Sahota |
| 6,831,603 B2 | 12/2004 | Menache |
| 6,838,989 B1 | 1/2005 | Mays et al. |
| 6,888,509 B2 | 5/2005 | Atherton |
| 6,974,928 B2 | 12/2005 | Boom |
| 7,009,496 B2 | 3/2006 | Arneson et al. |
| 7,034,689 B2 | 4/2006 | Teplitxky et al. |
| 7,039,359 B2 | 5/2006 | Martinez |
| 7,043,269 B2 | 5/2006 | Ono et al. |
| 7,053,755 B2 | 5/2006 | Atkins et al. |
| 7,058,368 B2 | 6/2006 | Nicholls et al. |
| 7,084,769 B2 | 8/2006 | Bauer et al. |
| 7,088,248 B2 | 8/2006 | Forster |
| 7,091,828 B2 | 8/2006 | Greeff et al. |
| 7,095,324 B2 | 8/2006 | Conwell et al. |
| 7,095,985 B1 | 8/2006 | Hofmann |
| 7,099,406 B2 | 8/2006 | Najarian et al. |
| 7,099,671 B2 | 8/2006 | Liang |
| 7,100,835 B2 | 9/2006 | Selker |
| 7,109,867 B2 | 9/2006 | Forster |
| 7,155,172 B2 | 12/2006 | Scott |
| 7,180,402 B2 | 2/2007 | Carrender et al. |
| 7,197,279 B2 | 3/2007 | Bellantoni |
| 7,199,713 B2 | 4/2007 | Barink et al. |
| 7,215,976 B2 | 5/2007 | Brideglall |
| 7,221,900 B2 | 5/2007 | Reade et al. |
| 7,256,682 B2 | 8/2007 | Sweeney, II |
| 7,257,079 B1 | 8/2007 | Bachrach |
| 7,284,703 B2 | 10/2007 | Powell et al. |
| 7,357,299 B2 | 4/2008 | Frerking |
| 7,375,634 B2 | 5/2008 | Sprague |
| 7,385,511 B2 | 6/2008 | Muchkaev |
| 7,388,468 B2 | 6/2008 | Diorio et al. |
| 7,388,501 B2 | 6/2008 | Tang et al. |
| 7,409,194 B2 | 8/2008 | Shi et al. |
| 7,411,505 B2 | 8/2008 | Smith et al. |
| 7,413,124 B2 | 8/2008 | Frank et al. |
| 7,429,953 B2 | 9/2008 | Buris et al. |
| 7,432,817 B2 | 10/2008 | Phipps et al. |
| 7,432,874 B2 | 10/2008 | Meissner |
| 7,440,743 B2 | 10/2008 | Hara et al. |
| 7,450,919 B1 | 11/2008 | Chen et al. |
| 7,460,014 B2 | 12/2008 | Pettus |
| 7,477,887 B2 | 1/2009 | Youn |
| 7,479,874 B2 | 1/2009 | Kim et al. |
| 7,492,812 B2 | 2/2009 | Ninomiya et al. |
| 7,526,266 B2 | 4/2009 | Al-Mahdawi |
| 7,548,153 B2 | 6/2009 | Gravelle et al. |
| 7,551,085 B2 | 6/2009 | Pempsell et al. |
| 7,557,762 B2 | 7/2009 | Shimasaki et al. |
| 7,561,866 B2 | 7/2009 | Oliver et al. |
| 7,562,083 B2 | 7/2009 | Smith et al. |
| 7,570,164 B2 | 8/2009 | Chakraborty et al. |
| 7,576,657 B2 | 8/2009 | Duron et al. |
| 7,580,378 B2 | 8/2009 | Carrender et al. |
| 7,583,179 B2 | 9/2009 | Wu et al. |
| 7,586,416 B2 | 9/2009 | Ariyoshi et al. |
| 7,592,898 B1 | 9/2009 | Ovard et al. |
| 7,592,915 B2 | 9/2009 | Liu |
| 7,594,153 B2 | 9/2009 | Kim et al. |
| 7,595,729 B2 | 9/2009 | Ku et al. |
| 7,596,189 B2 | 9/2009 | Yu et al. |
| 7,606,532 B2 | 10/2009 | Wuidart |
| 7,609,163 B2 | 10/2009 | Shafer |
| 7,612,675 B2 | 11/2009 | Miller et al. |
| 2001/0048715 A1 | 12/2001 | Lee et al. |
| 2002/0021208 A1 | 2/2002 | Nicholson et al. |
| 2002/0067264 A1 | 6/2002 | Soehnlen |
| 2002/0072344 A1 | 6/2002 | Souissi |
| 2002/0119748 A1 | 8/2002 | Prax et al. |
| 2002/0135481 A1 | 9/2002 | Conwell et al. |
| 2002/0141347 A1 | 10/2002 | Harp et al. |
| 2003/0021367 A1 | 1/2003 | Smith |
| 2003/0052161 A1 | 3/2003 | Rakers et al. |
| 2003/0156032 A1* | 8/2003 | Adams et al. ............... 340/572.7 |
| 2003/0228860 A1 | 12/2003 | Jou |
| 2004/0119593 A1 | 6/2004 | Kuhns |
| 2005/0084003 A1 | 4/2005 | Duron et al. |

| | | | |
|---|---|---|---|
| 2005/0099270 A1 | 5/2005 | Diorio et al. | |
| 2005/0099340 A1 | 5/2005 | Suzuki | |
| 2005/0107051 A1 | 5/2005 | Aparin et al. | |
| 2005/0114326 A1 | 5/2005 | Smith et al. | |
| 2005/0116867 A1 | 6/2005 | Park et al. | |
| 2005/0156031 A1 | 7/2005 | Goel et al. | |
| 2005/0179520 A1 | 8/2005 | Ziebertz | |
| 2005/0237843 A1 | 10/2005 | Hyde | |
| 2005/0259768 A1 | 11/2005 | Yang et al. | |
| 2006/0022800 A1 | 2/2006 | Krishna et al. | |
| 2006/0086809 A1 | 4/2006 | Shanks et al. | |
| 2006/0098765 A1 | 5/2006 | Thomas et al. | |
| 2006/0103533 A1 | 5/2006 | Pahlavan et al. | |
| 2006/0125603 A1 | 6/2006 | Nahear | |
| 2006/0132313 A1 | 6/2006 | Moskowitz | |
| 2006/0183454 A1 | 8/2006 | Al-Mahdawi | |
| 2006/0214773 A1 | 9/2006 | Wagner et al. | |
| 2006/0238302 A1 | 10/2006 | Loving et al. | |
| 2006/0252398 A1 | 11/2006 | Park et al. | |
| 2006/0267734 A1 | 11/2006 | Taki et al. | |
| 2006/0290502 A1 | 12/2006 | Rawlings | |
| 2007/0001809 A1 | 1/2007 | Kodukula et al. | |
| 2007/0001813 A1 | 1/2007 | Maguire et al. | |
| 2007/0018792 A1 | 1/2007 | Take et al. | |
| 2007/0029384 A1* | 2/2007 | Atherton | 235/435 |
| 2007/0046432 A1 | 3/2007 | Aiouaz et al. | |
| 2007/0060075 A1 | 3/2007 | Mikuteit | |
| 2007/0082617 A1 | 4/2007 | McCallister | |
| 2007/0096917 A1* | 5/2007 | Yang | 340/572.8 |
| 2007/0133392 A1 | 6/2007 | Shin et al. | |
| 2007/0139200 A1 | 6/2007 | Yushkov et al. | |
| 2007/0164868 A1 | 7/2007 | Deavours et al. | |
| 2007/0188305 A1 | 8/2007 | Drucker | |
| 2007/0206704 A1 | 9/2007 | Zhou et al. | |
| 2007/0206705 A1 | 9/2007 | Stewart | |
| 2007/0207284 A1* | 9/2007 | McClintic | 428/40.1 |
| 2007/0210173 A1* | 9/2007 | Nagel | 235/492 |
| 2007/0222604 A1 | 9/2007 | Phipps et al. | |
| 2007/0222606 A1 | 9/2007 | Phipps et al. | |
| 2007/0236335 A1 | 10/2007 | Aiouaz et al. | |
| 2007/0285238 A1 | 12/2007 | Batra | |
| 2007/0290846 A1 | 12/2007 | Schilling et al. | |
| 2008/0012688 A1 | 1/2008 | Ha et al. | |
| 2008/0018431 A1 | 1/2008 | Turner et al. | |
| 2008/0048867 A1 | 2/2008 | Oliver et al. | |
| 2008/0049870 A1 | 2/2008 | Shoarinejad et al. | |
| 2008/0065957 A1 | 3/2008 | Shoarinejad et al. | |
| 2008/0068173 A1 | 3/2008 | Alexis et al. | |
| 2008/0084310 A1 | 4/2008 | Nikitin et al. | |
| 2008/0136595 A1 | 6/2008 | Finkenzeller | |
| 2008/0143486 A1 | 6/2008 | Downie et al. | |
| 2008/0191961 A1 | 8/2008 | Tuttle | |
| 2008/0258916 A1 | 10/2008 | Diorio et al. | |
| 2008/0278286 A1 | 11/2008 | Takaluoma et al. | |
| 2009/0022067 A1 | 1/2009 | Gotwals | |
| 2009/0053996 A1 | 2/2009 | Enguent et al. | |
| 2009/0091454 A1 | 4/2009 | Tuttle | |
| 2009/0096612 A1 | 4/2009 | Seppa et al. | |
| 2009/0101720 A1 | 4/2009 | Dewan et al. | |

FOREIGN PATENT DOCUMENTS

| | | |
|---|---|---|
| EP | 0498369 | 8/1992 |
| EP | 0156440 | 12/1992 |
| EP | 0915573 | 5/1999 |
| EP | 0923061 | 6/1999 |
| EP | 1095427 | 5/2001 |
| EP | 1436857 | 7/2004 |
| FR | 2648602 | 12/1990 |
| GB | 1270456 | 4/1972 |
| JP | 1158836 | 6/1989 |
| JP | 2002-185381 | 6/2002 |
| JP | 2005-227818 | 8/2005 |
| JP | 2005-253058 | 9/2005 |
| JP | 2006-252367 | 9/2006 |
| KR | 2002-0091572 | 12/2002 |
| WO | WO 90/16119 | 12/1990 |
| WO | WO 99/05659 | 2/1999 |
| WO | WO 01/24407 | 4/2001 |
| WO | 02/095675 | 11/2002 |
| WO | WO 03/044892 | 5/2003 |
| WO | WO 04/001445 | 12/2003 |
| WO | WO 2005/072137 | 8/2005 |
| WO | WO 2006/037241 | 4/2006 |
| WO | WO 2006/068635 | 6/2006 |
| WO | WO 2007/003300 | 1/2007 |
| WO | 2007/092482 | 8/2007 |
| WO | WO 2007/094787 | 8/2007 |
| WO | WO 2007/126240 | 11/2007 |
| WO | WO 2009/058809 | 5/2009 |

OTHER PUBLICATIONS

International Preliminary Report on Patentability issued in International Application No. PCT/US2009/037633 on Jun. 29, 2010; 12 pages.

Bridgelall, Raj; "Bluetooth/802.11 Protocol Adaptation for RFID Tags"; Symbol Technologies, Research & Development, One Symbol Plaza, Holtsville, New York 11742; 4 pages. Retrieved from <http://www2.ing.unipi.it/ew2002/proceedings/001.pdf>.

Burgener, E.C.; "A Personal Transit Arrival Time Receiver;" IEEE—IEE Vehicle Navigation & Information Systems Conference; Ottawa, Ontario, Canada; 1993; pp. 54-55. Retrieved from <http://ieeexplore.ieee.org/xpl/freeabs_all.jsp?arnumber=585583>.

Cavoukian, Ann; "Adding an On/Off Device to Activate the RFID in Enhanced Driver's Licenses: Pioneering a Made-in-Ontario Transformative Technology that Delivers Both Privacy and Security"; Information and Privacy Commissioner of Ontario; Ontario, Canada; Mar. 2009; 3 pages. Retrieved from <http://www.ipc.on.ca/images/Resources/edl.pdf>.

Desmons, Dimitri; "UHF Gen 2 for Item-Level Tagging"; Impinji, Inc.; 24 pages. Retrieved from < http://www.impinj.com/files/Impinj_ILT_RFID_World.pdf>.

Donovan, John; "Software-Defined Radio Tackles Wireless Compatibility Issues"; Portable Design; Apr. 2006; pp. 8-12. Retrieved from <http://www.qmags.com/download/default.aspx?pub=PD&upid=11675&fl=others/PD/PD_20060401_Apr_2006.pdf>.

Han Y. et al.; "System Modeling and Simulation of RFID"; Auto-ID Labs at Fudan University, Shanghai, P.R. China; 12 pages. Retrieved from <http://citeseerx.ist.psu.edu/viewdoc/download?doi=10.1.1.116.7275&rep=rep1&type=pdf>.

Hansen, T. et al.; "Method for Controlling the Angular Extent of Interrogation Zones in RFID"; Seknion, Inc., 2000 Commonwealth Avenue, Suite 1008, Boston, MA 02135; 12 pages. Retrieved from <http://seknion.com/DOWNLOADS/Seknion_Paper_RFID.pdf>.

Hiltunen, Kimmo; "Using RF Repeaters to Improve WCDMA HSDPA Coverage and Capacity inside Buildings"; the 17$^{th}$ Annual IEEE International Symposium on Personal, Indoor, and Mobile Radio Communications (PIMRC-06); 2006; 5 pages. Retrieved from <http://www.ericsson.com/technology/research_papers/wireless_access/doc/PIMRC06_hiltunen.pdf >.

Khandelwal, G. et al. "Intelligent MAC Design for RFID Networks"; The Pennsylvania State University; 1 page.

Khandelwal, G. et al.; "OPT: Optimal Protocol Tree for Efficient Tag Identification in Dense RFID Systems"; IEEE International Conference on Communications; Jun. 11-15, 2006; pp. 128-133.

Kusy et al.; "Tracking Mobile Nodes Using RF Doppler Shifts"; Vanderbilt University, Nashville, Tennessee; 14 pages. Retrieved from <http://www.isis.vanderbilt.edu/sites/default/files/Kusy_B_11_7_2007_Tracking_M.pdf>.

"New Alien Software Can Identify Velocity, Position of Tags"; RFID News; Apr. 14, 2008; 2 pages. Retrieved from <http://www.rfidnews.org/2008/04/14/new-alien-software-can-identify-velocity-position-of-tags>.

O'Connor, Mary Catherine; "Wal-Mart Seeks UHF for Item-Level"; RFID Journal, Inc.; 2005; 2 pages. Retrieved from < http://www.rfidjournal.com/article/articleview/2228/1/1/>.

Rohatgi, A. et al.; "Implementation of an Anti-Collision Differential-Offset Spread Spectrum FRID System"; Georgia Institute of Technology, School of Electrical and Computer Engineering; IEEE Antennas Propagation Society International Symposium 2006; 4 pages. Retrieved from <http://www.propagation.gatech.edu/Archive/PG_CP_060710_AR/PG_CP_060710_AR.PDF>.

Waldrop et al.; "Colorwave: a MAC for RFID Reader Networks"; Auto-ID Center, Massachusetts Institute of Technology, Cambridge, MA; 4 pages.

Yu, P. et al.; "Securing RFID with ULTRA-Wideband Modulation"; Virginia Tech Electrical and Computer Engineering Department; Blacksburg, VA; Workshop on RFID Security; Jul. 2006; 12 pages. Retrieved from <http://events.iaik.tugraz.at/RFIDSec06/Program/papers/004%20-%20Ultra%20Wideband%20Modulation.pdf>.

"Near Field UHF Versus HF"; IDTechEx; May 16, 2006; 1 pages. Retrieved from <http://www.idtechex.com/research/articles/near_field_uhf_versus_hf_00000474.asp>.

Kiming, Q. et al.; "Development of a 3cm Band Reflected Power Canceller "; Research Institute of Navigation Technology; 2001 CIE International Conference on, Proceedings; 2001; pp. 1098-1102.

"Developments in Printed Conductors and Tags"; IDTechEx; Jun. 6, 2005; 1 page. Retrieved from <http://www.idtechex.com/research/articles/developments_in_printed_conductors_and_tags_00000188.asp>.

Ryu, H-K. et al.; "Size Reduction in UHF Band RFID Tag Antenna Based on Circular Loop Antenna"; 18th International Conference on Applied Electromagnetics and Communications, ICECom; Oct. 12-14, 2005; pp. 1-4.

Binu P, et al.; "A New Microstrip Patch Antenna for Mobile Communications and Bluetooth Applications"; Microwave and Optical Technology Letters; vol. 33, No. 4, May 20, 2002; pp. 285-286.

Garg et al.; "Microstrip Radiators"; Microstrip Antenna Design Handbook; Artech House, Inc. Norwood, MA; 2001; pp. 1-72.

"Radio Frequency Identification (RFID) Primer" 23 pages. Retrieved from <http://ocw.mit.edu/NR/rdonlyres/Sloan-School-of-Management/15-762JSpring-2005/23F46055-7F21-4046-B2C3-7E96680790DD/0/rfid_primer.pdf>.

* cited by examiner

DETECTING TAMPERED WITH RADIO FREQUENCY IDENTIFICATION TAGS

TECHNICAL FIELD

This invention relates to radio frequency identification (RFID) systems and, more particularly, to detecting tampered with RFID tags.

BACKGROUND

Radio Frequency Identification (RFID) is being used increasingly as a means to identify goods at a distance, without requiring physical contact or even line of sight access to the goods. RFID enables information about an item to be stored on an item, and in some implementations also allows this stored information to be modified at a distance. The most compact and cost effective means to provide this RFID capability is by means of a pressure sensitive (i.e. self adhesive) label incorporating an RFID capability.

The ability to detect remotely whether a pressure sensitive label or seal applied to an item has been tampered with or removed is becoming increasingly important in order to detect theft, product substitution, tampering, warranty violation and other problems.

SUMMARY

The present disclosure is directed to a system and method for tracking tampered with RFID tags. In some implementations, an RFID tag includes a tearable substrate including at least a portion of an RFID circuit. The portion of the RFID circuit is substantially destroyable in response to at least an attempt to remove the tag from a surface. In addition, the RFID includes an adhesive layer adjacent at least a portion of the tearable substrate and configured to affix the tag to the surface.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
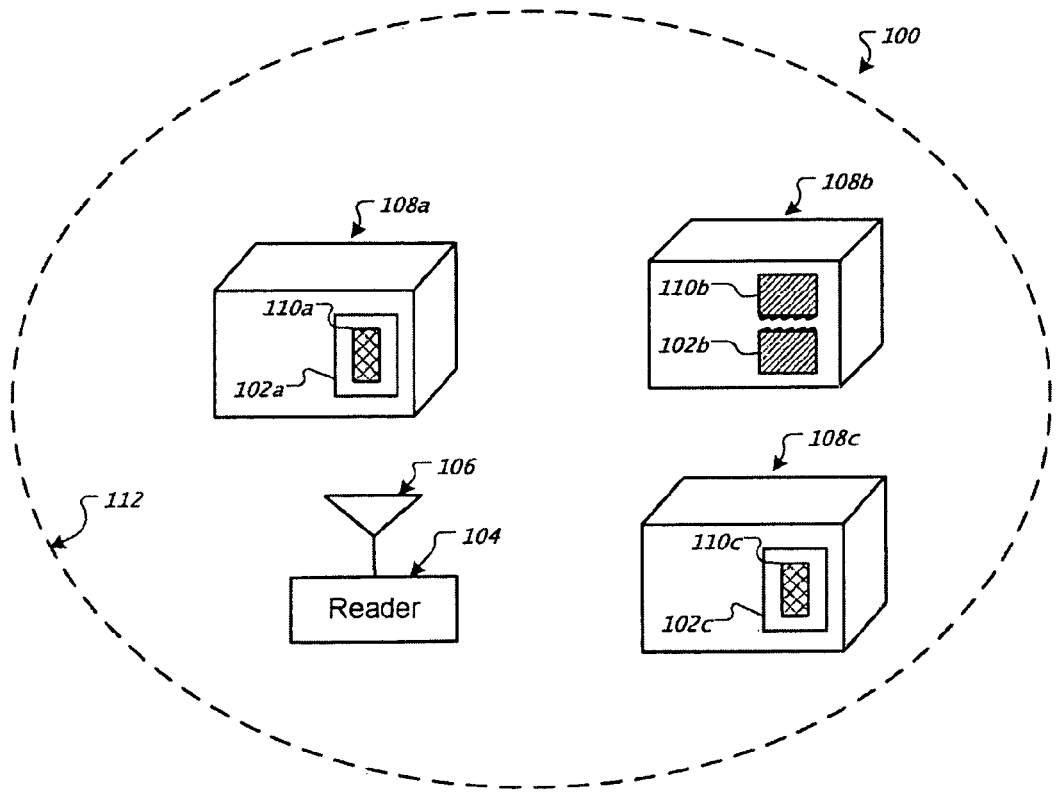
FIG. 1 is a tracking system in accordance with some implementations of the present disclosure.

FIG. 1 is a block diagram illustrating an example system 100 for tracking alternations to Radio Frequency IDentification (RFID) tags in accordance with some implementations of the present disclosure. For example, one or more RFID tags may include RFID circuits on tearable substrates such that at least partial removal destroys one or more RFID components resulting in the tag being at least substantially inoperable. Tearable materials may include fiber material (e.g., paper), certain fabrics, certain plastics, and/or other material that tear or otherwise break in response to a force such as shearing. In some implementations of tracking alterations, the system 100 may initially identify a plurality of RFID tags affixed or otherwise coupled to assets, periodically poll the RFID tags to determine an associated status (e.g., location), and determine that one or more RFID tags are tampered with, altered or otherwise not operating within specifications (e.g., inoperable). In general, the system 100 may include RFID tags such that attempts to remove or otherwise modify the tags result in at least modifying the operation of the RFID tags. For example, an RFID tag may be destroyed in an attempt to remove the RFID tag and, as a result, may not transmit information detectable by an RFID reader. In some implementations, the system 100 can include RFID tags embedded or otherwise incorporate in a tearable material (e.g., paper) such that attempts to remove, relocate, or otherwise modify a tag affixed to a surface can result in the material tearing and destroying a portion of the RFID tag.

At a high level, the system 100 includes RFID tags 102a-c communicably coupled with an RFID reader 104. The RF reader 104 transmits requests for information to the tags 102 through one or more antennas 106. In response to at least the request, the tags 102 transmits a response that may include information identifying a specific tag and/or associated asset 108. The tags 102 may be affixed or otherwise coupled to assets 108 such that an attempt to remove or otherwise modify the tags 102 may destroy at least a portion of the RF circuit, as illustrated by the tag 102b. In the illustrated implementation, the tags 102 include substrates 110. The substrates 110 include at least a portion of the RF electric circuit for communicating with the reader 104. In the event that a tag 102 is removed, relocated or otherwise modified at least a portion of the substrate 110 may be destroyed making the tag 102 at least partially inoperable. In this case, the reader 104 may detect RFID tags 102 that have been removed or otherwise modified.

Turning to a more detailed description, the RFID tags 102 can include any software, hardware, and/or firmware configured to wirelessly communicate RF signals with the reader 104. In some implementations, the tags 102 may operate without the use of an internal power supply. Rather, the tags 102 may transmit a reply to a received signal using power from received RF signals independent of an internal power source. This mode of operation is typically referred to as backscattering. The tags 102 can, in some implementations, receive signals from or transmit signals to the RFID antennas 106. In some implementations, the tags 102 can alternate between absorbing power from signals transmitted by the reader 104 and transmitting responses to the signals using at least a portion of the absorbed power. In passive tag operation, the tags 102 typically have a maximum allowable time to maintain at least a minimum DC voltage level. In some implementations, this time duration is determined by the amount of power available from an antenna of a tag 102 minus the power consumed by the tag 102 to charge the on-chip capacitance. The effective capacitance can, in some implementations, be configured to store sufficient power to support the internal DC voltage when the antenna power is disabled. The tag 102 may consume the stored power when information is either transmitted to the tag 102 or the tag 102 responds to the reader 104 (e.g., modulated signal on the antenna input). In transmitting responses, the tags 102 may include one or more of the following: an identification string, locally stored data, tag status, internal temperature, and/or other parameters. In the illustrated implementation, the tags 102 include substrates 110 for processing RF signals.

The substrate 110 can include any software, hardware, and/or firmware for processing RF signals. For example, the substrate 110 may include a fibrous material (e.g., paper) with an embedded RFID circuit. In some implementations, the substrate 110 can tear in response to an applied force such that at least a portion of the RFID circuit (e.g., tuning loop) is destroyed or otherwise rendered inoperable. For example, the substrate 110 may break one or more electrical connections in the RFID circuit such that the tag 102 fails. In some implementations, the substrate 110 includes an RFID circuit that is printed on a material using, for example, a carbon/graphite based conductive ink, metal ink (e.g., silver), and/or other ink. In connection with printing a circuit, the substrate 110 may be heated for a period of time to at least partially diffuse the circuit into the material. For example, the substrate 110 may be heated at 100° C. or greater for a period of a minute or longer. In some implementations, the substrate 110 includes an RFID circuit at least partially formed using one or more electrically conductive adhesives. Components of the RFID circuit may include one or more of the following metals: silver, aluminum, copper, and/or others. In general, the substrate 110, including the RFID circuit, may not have a high intrinsic physical strength such that operation of the RFID circuit is at least disrupted in the event that the tag 102 is removed or at least modified. In some implementations, an adhesive (not illustrated) is applied to the substrate 110 such that the substrate is affixed to a surface of a container 108. The substrate 110 may be directly affixed to a surface of an asset (not illustrated) without departing from the scope of this disclosure.

The containers 108 may be any article capable of holding, storing or otherwise at least partially enclosing one or more assets (e.g., produce, goods). For example, the containers 108 may be RPCs including produce immersed in water. In some implementations, each container 108 may include one or more tags 102. In some examples, the tag 102 may be affixed to a surface of the container 108. In some implementations, the containers 108 may be of any shape or geometry that, in at least one spatial arrangement and/or orientation of the containers 108, facilitates communication between the tags 102 and the reader 104. For example, the geometry of the containers 108 may include right angles (as illustrated), obtuse and/or angles, rounded corners and/or rounded sides, and a variety of other features. In some implementations, the containers 108 may be formed from or otherwise include one or more of the following: cardboard, paper, plastic, fibers, wood, and/or other materials.

The RFID reader 104 can include any software, hardware, and/or firmware configured to transmit and receive RF signals. The RFID reader 104 may transmit requests for information within an interrogation zone 112 associated with the reader 104. The reader 104 may transmit the query in response to a request, automatically, in response to a threshold being satisfied (e.g., expiration of time), as well as others events. The interrogation zone 112 may be based on one or more parameters such as transmission power, associated protocol, nearby impediments (e.g., objects, walls, buildings), as well as others. The RFID reader 104 may include a controller, a transceiver coupled to the controller, and one or more RF antennas 106 coupled to the transceiver. In the illustrated example, the RF antenna 106 transmits commands generated by the controller and receive responses from RFID tags 102. In certain cases such as tag-talks-first (TTF) systems, the reader 104 may not transmit commands but only RF energy. In some implementations, the controller can determine statistical data and/or position data based, at least in part, on tag responses. The reader 104 often includes a power supply or may obtain power from a coupled source for powering included elements and transmitting signals. In some implementations, the reader 104 operates in one or more of frequency bands allotted for RF communication. For example, the Federal Communication Commission (FCC) have assigned 902-928 MHz and 2400-2483.5 MHz as frequency bands for certain RFID applications. In some implementations, the reader 104 may dynamically switch between different frequency bands. The reader 104 can, in some implementations, include three or more antennas 106 in any geometric configuration that allows triangulation based, at least in part, on TDOA. In some implementations, the antennas 106 may be selectively positioned to optimize, enhance, or otherwise increase precision and/or accuracy of position tracking.

In one aspect of operation, the reader 104 periodically transmits signals in the interrogation zone 112. In the event that the transmitted signal reaches the tags 102, the tags 102 processes the signals. In response to at least receiving the signal, the tags 102 transmit a response including, for example, information identifying the tag 102. The reader 104 may identify an initial group of tags 102 for tracking tampered with tags 102. In subsequent polling, the reader 104 may compare identified tags 102 to previously identified tags 102. In the event that the tag 102*b* was tampered with, the reader 104 may identify the tag 102*b* as not operating within specifications. In some implementations, the reader 104 may generate a notification identifying the tag 102*b* and/or associated container 108*b*.

Figure 2A:
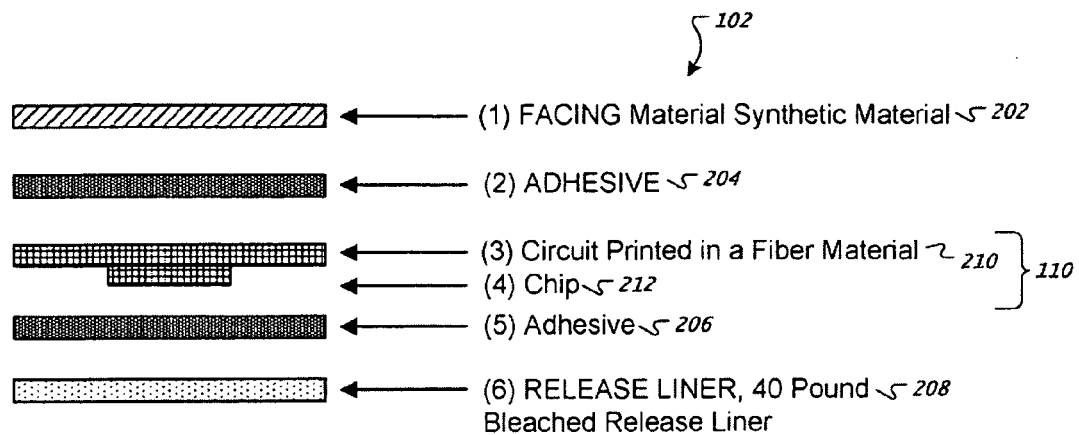
FIGS. 2A and 2B illustrate a cross-sectional view of an example tag of FIG. 1 in accordance with some implementations of the present disclosure.
Figure 2B:
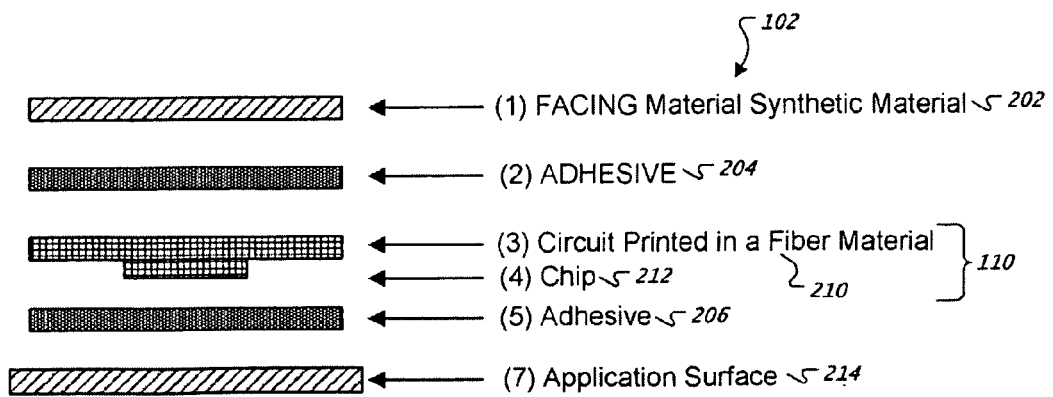

FIGS. 2A and 2B illustrate an example tag 102 of FIG. 1 in accordance with some implementations of the present disclosure. In the illustrated implementation, the tag 102 is a tamper-proof or Break On Removal (BOR) tag. In this case, the tag 102 may be destroyed in the event of removal, partial removal, and/or an attempt of removal. In other words, the electronic circuit of the tag 102 may be destroyed upon removal or relocation from its original placement. For example, a tuning loop of the tag 102 may be inlayed on a fiber material such that at least partial removal of the fiber material damages the tuning loop resulting in the tag 102 being inoperable.

In the illustrated implementation, the tag 102 includes a facing material 202, a first adhesive 204, a substrate 110, a second adhesive 206, and a release liner 208. The illustrated layers are for example purposes only, and the tag 102 may include some, all or different layers without departing from the scope of this disclosure. For example, the tag 102 may not include the facing material 202 and the first adhesive 204. In the example tag 102, the substrate 110 includes an RFID circuit 210 in a fiber material and a chip 212 (e.g., memory chip). The RFID circuit 210 includes RFID components for transmitting and receiving RF signals from the reader 104. In some implementations, the RFID circuit 210 may be active such that the substrate 110 includes battery power and/or other internal power supply. The RFID circuit 210 may include electrical connections between the different components (e.g., tuning loop) as well as one or more antennas for receiving and transmitting wireless signals. The facing material 202 may be affixed to the substrate 110 using the adhesive layer 204. In some implementations, the facing material 202 provides a top surface for the tag 102 protecting the RFID circuit 210. At least a portion of the facing material 202 may be substantially transparent such that damage to the RFID circuit 210 may be visible. In some implementations, the facing material 202 may be configured to receive print, symbols, and/or other information (e.g., bar code, serial number). The facing material 202 may include one or more of the following: polyester, polypropylene, plastic, and/or other material. In some implementations, the facing material 202 is substantially untearable relative to the substrate 110. The release liner 208 may be affixed to the substrate 110 using the adhesive 206 and may be used to attach the tag 102 to a surface such as the surface of the container 108. In some implementations, the adhesive 204 and/or 206 can be transfer adhesives previously applied to the facing material 202 and/or the release liner 208. In this case, the substrate 110 may be affixed to the facing material 202 and/or the release liner 208 by aligning the substrate with the previously applied adhesives 204 and/or 206. FIG. 2B illustrates the tag 102 without the release liner 208. In this case, the tag 102 may be affixed to a surface 214 using the adhesive 206.

Figure 3:
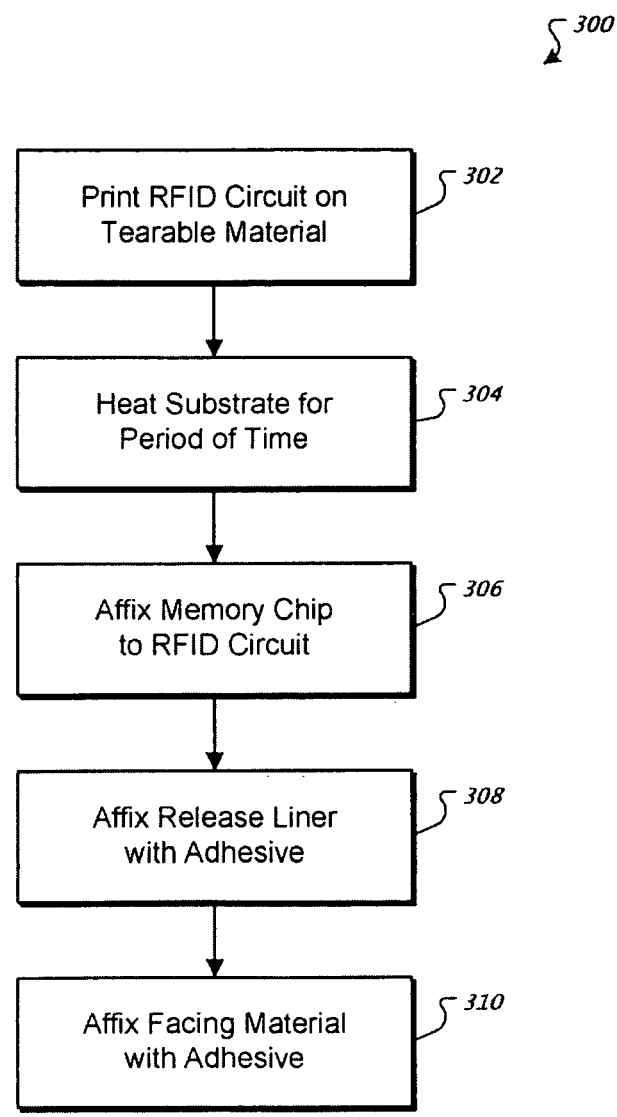
FIG. 3 is a flow chart illustrating an example method of manufacturing break on removal (BOR) tags.

FIG. 3 is a flowchart illustrating an example method 300 for manufacturing BOR tags in accordance with some implementations of the present disclosure. Generally, the method 300 describes an example process for printing at least a portion of an RFID circuit on a tearable material. The method 300 may use any appropriate combination and arrangement of logical elements implementing some or all of the described functionality.

The method 300 begins at step 302 where at least a portion of an RFID circuit is printed on tearable material. For example, the RFID circuit may be printed on paper using silver-based ink. In some implementations, the RFID circuit is printed using a flexography screen, offset printing, and/or other processes. At step 304, the substrate including the printed circuit is heated to a certain temperature for a period of time. For example, the substrate may be heated at 100° C. or greater for a minute or longer. In some implementations, the RFID circuit diffused into the material as a result of the heating processes. Next, at step 306, a memory chip is affixed to the RFID circuit using, for example, a conductive adhesive. In some implementations, the adhesive may be curred using thermal compression. A release liner is affixed to the substrate using an adhesive at step 308. At step 310, a facing material is affixed to the substrate using an adhesive.

Figure 4:
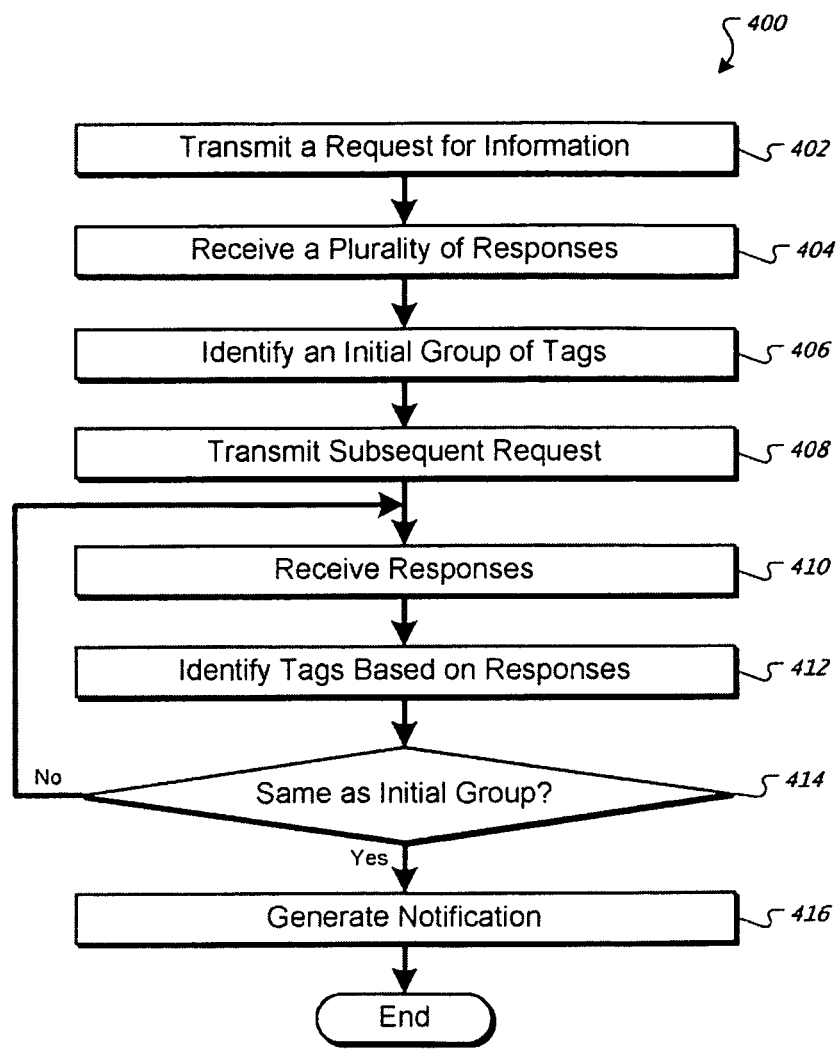
FIG. 4 is a flow chart illustrating an example method of monitoring BOR tags.

FIG. 4 is a flowchart illustrating an example method 400 for tracking tampered with RFID tags in accordance with some implementations of the present disclosure. Generally, the method 400 determines whether a tag has stopped transmitting detectable signals to an RFID reader. The method 400 may use any appropriate combination and arrangement of logical elements implementing some or all of the described functionality.

Method 400 begins at step 402 where an RFID transmits a request for information within an interrogation zone. For example, the RFID reader 104 may transmit a request for information with the interrogation zone 112. At step 404, the RFID reader receives a plurality of responses from tags within the interrogation zone. In the example, the tags 102a-c may initially transmit response to the RFID reader 104. Next, at step 406, the RFID reader identifies an initial group of tags based, at least in part, on the plurality of responses. Again in the example, the RFID reader 104 may identify the tags 102a-c using information included in the responses. A subsequent request for information is transmitted at step 408 and, at step 410, subsequent responses from the tags are received. At step 412, the tags transmitting the subsequent responses are identified. Turning to the example, the reader 104 may determine that only tags 102a and 102c transmitted responses to the subsequent request. If the subsequent group of tags is the same as the initial group of tags at decisional step 414, then execution returns to step 408. If the subsequent group of tags is not the same as the initial group of tags at decisional step 414, then a notification identifying a tag that has been tampered with is generated at step 416.

A number of embodiments of the invention have been described. Nevertheless, it will be understood that various modifications may be made without departing from the spirit and scope of the invention.

What is claimed is:

1. A Radio Frequency IDentification (RFID) tag, comprising:
    a plastic substrate having a bottom surface;
    a fibrous substrate having a top surface and a bottom surface and including at least a portion of an RFID circuit on the bottom surface, wherein the RFID circuit is diffused into the fibrous substrate;
    a chip directly connected to the portion of the RFID circuit on the bottom surface of the fibrous substrate and affixed to the bottom surface of the fibrous substrate;
    a first adhesive layer adjacent the bottom surface of the plastic substrate and the top layer of the fibrous substrate and configured to affix the plastic substrate to the fibrous layer; and
    a second adhesive layer adjacent the portion of the RFID circuit and the chip and configured to affix the portion of the RFID circuit and the chip to an object surface, wherein the RFID circuit is substantially destroyed in response to at least an attempt to remove the fibrous substrate from the object surface.

2. The RFID tag of claim 1, wherein the RFID circuit includes a metallic ink.

3. The RFID tag of claim 1, wherein the RFID circuit includes a tuning loop such that the tuning loop is substantially destroyed in response to at least an attempt to remove the tag.

4. The RFID tag of claim 1, wherein the RFID circuit is destroyed in response to at least shearing substantially parallel to a plane of the fibrous substrate.

5. The RFID tag of claim 1, wherein the RFID circuit is destroyed in response to at least shearing substantially perpendicular to a plane of the fibrous substrate.

6. The RFID tag of claim 1, further comprising a release liner affixed to at least a portion of a surface of the fibrous substrate using the second adhesive layer.

7. The RFID tag of claim 1, wherein the RFID circuit is at least partially diffused into the fibrous substrate using one or more thermal processes.

8. The RFID tag of claim 1, wherein the chip comprises a memory connected to the RFID circuit using thermal compression.

9. The RFID tag of claim 1, wherein the RFID circuit is passive.

10. The RFID tag of claim 1, wherein the tag is inoperable when the portion of the RFID circuit is destroyed.

11. The RFID tag of claim 1, wherein the portion of the RFID circuit is destroyed when the substrate is torn during an attempt to remove the tag.

12. A method of manufacturing a Break On Removal (BOR) tag, comprising:
    printing a least a portion of an RFID circuit on a bottom surface of a fiber material;
    heating the fiber material for a period of time to diffuse at least a portion of the RFID circuit into the bottom surface of the fiber material;
    affixing a top surface of the fiber material to a bottom surface of a plastic substrate using a first adhesive layer;
    affixing a memory chip the bottom surface of the fiber material;

directly connecting the memory chip to the at least portion of RFID circuit diffused into the bottom surface of the fiber material; and affixing a release liner to the RFID circuit and the chip on the fiber material using a second adhesive layer.

13. The method of claim 12, wherein the portion of the RFID circuit is printed using flexography.

14. The method of claim 12, wherein the RFID circuit is printed using conductive ink.

15. The method of claim 12, wherein the fiber material is paper.

16. The method of claim 12, wherein the fiber material is heated to 100° C. or greater.

17. The method of claim 12, further comprising affixing a facing material adjacent the RFID circuit using an adhesive.

* * * * *

UNITED STATES PATENT AND TRADEMARK OFFICE
CERTIFICATE OF CORRECTION

| | | |
|---|---|---|
| PATENT NO. | : 8,427,316 B2 | |
| APPLICATION NO. | : 12/052544 | |
| DATED | : April 23, 2013 | |
| INVENTOR(S) | : Wolf Bielas | |

It is certified that error appears in the above-identified patent and that said Letters Patent is hereby corrected as shown below:

On Title Page 3, In Column 2 Item 56 (Other Publications), In Line 18, Delete "Impinji," and insert -- Impinj, --, therefor.

On Title Page 3, Column 2 Item 56 (Other Publications), In Line 56, Delete "FRID" and insert -- RFID --, therefor.

In the Claims:

In Column 6, In Line 59, In Claim 12, delete "a least" and insert -- at least --, therefor.

Signed and Sealed this
Eleventh Day of March, 2014

Michelle K. Lee
*Deputy Director of the United States Patent and Trademark Office*